H. S. OSBORNE.
MEANS FOR REDUCING INTERFERENCE.
APPLICATION FILED NOV. 13, 1918.
1,390,580
Patented Sept. 13, 1921.
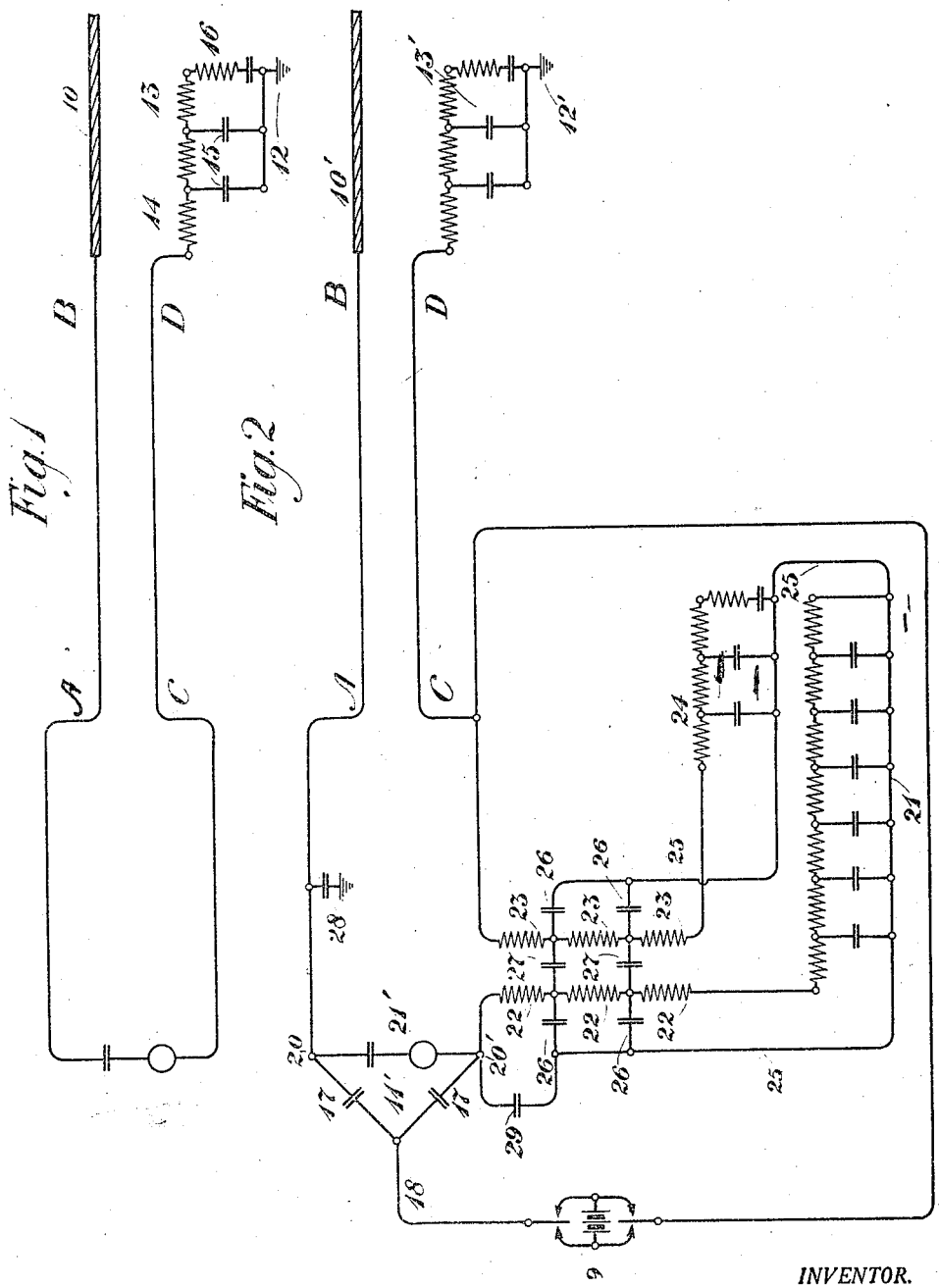
INVENTOR.
H. S. Osborne
BY G. E. Folk,
ATTORNEY

UNITED STATES PATENT OFFICE.

HAROLD S. OSBORNE, OF NEW YORK, N. Y., ASSIGNOR TO AMERICAN TELEPHONE AND TELEGRAPH COMPANY, A CORPORATION OF NEW YORK.

MEANS FOR REDUCING INTERFERENCE.

1,390,580.  Specification of Letters Patent.  Patented Sept. 13, 1921.

Application filed November 13, 1918. Serial No. 262,362.

*To all whom it may concern:*

Be it known that I, HAROLD S. OSBORNE, residing at New York, in the county of New York and State of New York, have invented certain Improvements in Means for Reducing Interference, of which the following is a specification.

This invention relates to signaling over ocean cables or other conductors of like character, and its object is to avoid the evil effect of induced interfering currents in the terminal conductors of such signaling systems, at the same time providing an accurate balance in cases in which the cables are used for duplex service.

In ocean cable signaling for instance the terminal office is often located at such a distance from the shore as to require the use of a considerable length of intervening cable or other conductor which is subject to interference from adjacent power circuits or other current sources. Also the ground return for such circuits is customarily placed some miles out at sea for the purpose of avoiding interference from local ground potentials, and this sea ground must also be connected with the terminal office by a conductor. The conductors connecting the sea ground and the cable with the terminal office may frequently be a pair of conductors in a single cable, both of which will then be subject to the same induced potentials from outside sources. The present invention overcomes the difficulties due to such interference and at the same time provides for an accurate and adjustable balance for duplex operation.

The invention will be more fully understood from a consideration of the accompanying drawings in which Figure 1 represents one embodiment thereof applied to a cable arranged for simplex operation and Fig. 2 a modification arranged for duplex operation.

Referring to Fig. 1, the cable 10 is connected to the receiving apparatus 11 by a conductor A—B and a similar conductor C—D extends from the receiving apparatus to the ground 12 at sea. The conductors A—B and C—D are subject to inductive interference from outside sources and unless means to avoid their effect is provided there will be disturbances in the receiving apparatus interfering with the speed and quality of the signals. To meet this difficulty an artificial line 13 is located between the point D and the sea ground 12, which has an impedance simulating the impedance of the cable 10. It is here shown as comprising series resistances 14 and shunt capacities 15, together with a terminal section 16 consisting of a resistance and capacity in series. This artificial line need not duplicate the cable with the same degree of accuracy as is required in balancing an ocean cable for duplex operation, but merely within the limits required by the character of the disturbing influences affecting conductors A—B and C—D. With the artificial line 13 balancing the cable 10 and located beyond the sphere of disturbing influences, it will be seen that the impedance between point D and the sea ground is the same as the impedance between point B and ground through the cable; hence, disturbing potentials induced in the conductors A—B and C—D will neutralize each other in the receiving apparatus. In the absence of such a balance of the impedances beyond B and D, the potentials at the treminals of the receiving apparatus due to the disturbing influences would be unbalanced because of the capacity to ground between the conductors A—B and C—D, through which the induced voltages would have separate closed circuits of unlike impedances.

In applying the invention to a duplex cable a more complicated arrangement is required. It is necessary to locate the artificial line for giving the duplex balance at the terminal office, in order that it may be properly adjusted from time to time to the exactness of balance required by this service. The ground connection for the artificial line cannot, however, be located at this office, because of local ground potentials, and on the other hand, if located at sea as usual the conductor connecting it with the local office is unavoidably subject to disturbing influences as above pointed out. To overcome at once the effects of induction in the conductors running to the sea and to secure the required accuracy of duplex balance, I provide the arrangement shown in Fig. 2, in which the cable 10' is connected to the terminal apparatus 11' by conductor A—B as in Fig. 1. The terminal apparatus comprises the usual duplex equipment including the ratio arms 17—17, at the junction 18 of which the transmitting apparatus 19 is connected, and across the extremities 20 and 20' of which the receiving apparatus 21' is connected. The ground return is provided by a conductor C—D running to sea ground 12'. In this arrangement the connecting conductors A—B and C—D between the terminal office and the cable and sea ground respectively are subject to disturbing influences as in the circuit shown in Fig. 1, and there is further the necessity of balancing the line so that current impulses transmitted from 19 will divide equally through the arms 17—17, giving no difference of potential between the points 20—20', between which the receiving apparatus of the set is connected. It will be clear if a balancing artificial line sufficiently like the cable between the point B and ground, were connected between the point D and the sea ground, there would be a complete balancing of the disturbing voltages induced in the conductors A—B and C—D for reasons pointed out in discussing Fig. 1, and also an accurate balance for the duplex set, since the impedances between the points 20—20' and ground through the cable and the artificial line would then be precisely equal. Since, however, the necessity for a frequent adjustment of the artificial line precludes its being placed out at sea, and since the difficulties of properly maintaining even a given adjustment under such conditions is prohibitive, I place the artificial line 21 for the duplex balance at the terminal office, and place a separate balancing line 13' at the sea ground for the purpose of avoiding the unbalance in the terminal apparatus resulting from induced potential in the conductors A—B and C—D. This balancing line 13' as in the case of the simplex arrangement of Fig. 1, may be comparatively simple, and its value when once determined need not ordinarily be changed from time to time as in the case of the duplex balancing network. In order that the additional artificial line 13 shall not unbalance the system for duplex operation, I provide additional apparatus so arranged that the point of the Wheatstone bridge of which the ratio arms 17—17 constitute two sides, is located at the point C instead of at the sea ground 12' as would otherwise be the case. Since one arm of the bridge will then extend between the point 20 and the point C, and include the conductor A—B, the cable 10', the artificial line 13' and the conductor C—D, I provide between the point C and the point 20', in addition to the artificial line 21, impedances 22 and 23 corresponding respectively to the impedances of the conductors A—B and C—D and the artificial line 24 corresponding to the artificial line 13'. The conductor 25 uniting the terminals of the artificial line 21 and 24 corresponds to the ground return between the remote end of the cable 10' and the sea ground 12'. Inasmuch as the conductors A—B and C—D have a capacity to ground I preferably balance this by connecting capacities 26 between the impedances 22 and 23 to the conductor 25; and if the conductors A—B and C—D are in the same cable or otherwise so arranged as to have a mutual capacity, a capacity 27 will be connected between the impedances 22 and 23 to balance this.

It will now be seen that in passing from the point 20' to the point C the circuit includes an impedance 22, an artificial line 21, an artificial line 24 and an impedance 23 which correspond respectively to the impedances of the conductors A—B, the cable 10' the artificial line 13' and the conductor C—D which are traversed in passing from the point 20 to the point C. Hence, impulses transmitted from 19 will produce equal potentials at the points 20—20' and the receiving apparatus will therefore be unaffected by the local transmitter. At the same time the circuits in which the induced disturbing influences in conductors A—B and C—D operate, that is, the circuits represented by these conductors, their capacity to ground and their connections to ground through the cable 10' and the sea ground at 12' respectively, are balanced by the presence of the artificial line 13' as in Fig. 1.

If it is desired to further improve the balance for disturbing potentials by taking into account the slight capacity to ground of the apparatus represented by the artificial lines 21 and 24 and the impedances 22 and 23 with their connecting conductors, a capacity or other admittance may be connected between the other side of the line and ground as at 28. It may then be desirable, to maintain the duplex balance, to connect an equal admittance 29 between 20 and conductor 25.

It will be seen that by this arrangement it is possible to produce a complete and accurate balance for duplex operation in which the artificial line is conveniently located for adjustment and in which there is at the same time no disturbance in the terminal apparatus due to the inductive action on the conductors leading to cable and the sea ground.

Where the freedom from induced interferences is such that it becomes unnecessary to use the balancing line 13 at the sea ground, the perfection of balance for duplex operation herein described may still be attained by including at the office end of the grounded conductor the elements 22, 23, 26, 27, 28 and 29 for balancing the conductors A—B and C—D. When the artificial line 13 is omitted at the sea ground the corresponding artificial line 24 at the opposite end of the conductor C—D will, of course, also be omitted.

It is to be understood that the invention is not limited to the exact arrangement here shown and described, as various modifications within the spirit of the invention and scope of the appended claims will be obvious to those skilled in the art.

What I claim is:

1. In a signal transmitting system, a line conductor, a receiving apparatus connected thereto, a return circuit for said receiving apparatus having an impedance different from that of the line conductor, a pair of conductors connecting the line conductor and the return circuit with said receiving apparatus, and means located between said return circuit and the adjacent end of the conductor connecting it with the receiving apparatus for preventing the receiving apparatus from being affected by voltages induced in said pair of conductors by outside sources.

2. In a signal transmitting system, a line conductor, a receiving apparatus connected thereto, a ground return for said receiving apparatus, a pair of conductors connecting the line conductor and the ground connection with said receiving apparatus, and an artificial line simulating the impedance of the line conductor, located between the ground connection and the adjacent end of the conductor connecting it with the receiving apparatus for preventing the receiving apparatus from being affected by voltages induced in said pair of conductors by outside sources.

3. In a signaling system, a line conductor, a duplex set for sending and receiving messages thereover, a ground return for said duplex set, a conductor connecting said line conductor with said duplex set, a second conductor connecting the ground connection with said duplex set, means at the ground end of said second conductor for preventing disturbances in the duplex set due to voltages induced in said conductors by outside sources, and means at the other end of said second conductor for balancing the circuit for duplex operation.

4. In a signaling system, an ocean cable, a duplex set for sending and receiving messages thereover, a return circuit for said duplex set grounded at sea, a conductor connecting said cable with said duplex set, a second conductor connecting said sea-ground with said duplex set, an artificial line simulating the impedance of the cable at the sea-ground end of said second conductor for preventing disturbances in the duplex set due to voltages induced in said conductors by outside sources, and means at the other end of said second conductor for balancing the circuit for duplex operation.

5. In a signal transmitting system, an ocean cable, a duplex set for sending and receiving messages thereover, a return circuit for said duplex set grounded at sea, a conductor connecting said cable and said duplex set, a second conductor connecting said sea ground and said duplex set, means at the sea-ground end of said second conductor for preventing disturbances in said duplex set due to voltages induced in said conductors by outside sources and means located between the duplex set and the other end of said second conductor for electrically balancing said cable, said two conductors and said means.

6. In a signal transmitting system, an ocean cable, a duplex set for sending and receiving messages thereover, a return circuit for said duplex set grounded at sea, a conductor connecting said cable and said duplex set, a second conductor connecting said sea-ground and said duplex set, an artificial line simulating the impedance of the cable at the sea ground end of said second conductor for preventing disturbances in said duplex set due to voltages induced in said conductors by outside sources, and means located between the duplex set and the other end of said second conductor for electrically balancing said cable, said two conductors and said artificial line.

7. In a signal transmitting system, an ocean cable, a duplex set for sending and receiving messages thereover, a return circuit for said duplex set grounded at sea, a conductor connecting said cable and said duplex set, a second conductor connecting said sea-ground and said duplex set, an artificial line simulating the impedance of the cable at the sea-ground end of said second conductor for preventing disturbances in said duplex set due to voltages induced in said conductors by outside sources, and means located between the duplex set and the other end of said second conductor for electrically balancing said cable, said two conductors, and said artificial line, and a condenser connected between said first named conductor and ground for balancing the capacity to ground of said electrical balancing means.

8. In a signal transmitting system, a line conductor, a receiving apparatus connected thereto, a return circuit for said receiving apparatus having an impedance different from that of the line conductor, a pair of conductors connecting the line conductor and the return circuit with said receiving apparatus, said conductors being of sufficient geographical and electrical extent to remove the junction with said return conductor from the influence of disturbances in the region of said receiving apparatus, and means, located between the receiving apparatus and the conductor leading to said return circuit, for balancing said line conductor and said pair of conductors.

9. In a signal transmitting system, a line conductor, a receiving apparatus connected thereto, a ground return located at a point sufficiently remote from said receiving apparatus to be beyond the influence of electrical disturbances in the region of the receiving apparatus, a pair of conductors connecting the line conductor and the ground connection with said receiving apparatus, and an artificial line located between the receiving apparatus and the conductor leading to the ground connection and designed to balance said line conductor and means to balance said pair of conductors.

10. In a signal transmitting system, a line conductor, a receiving apparatus connected thereto, a ground return located at a point sufficiently remote from said receiving apparatus to be beyond the influence of electrical disturbances in the region of the receiving apparatus, a pair of conductors connecting the line conductor and the ground connection with said receiving apparatus, an artificial line in circuit between said receiving apparatus and the conductor leading to the ground connection for balancing said line conductor, and means associated with said artificial line for balancing said pair of conductors.

11. In a signal transmitting system, a line conductor, sending apparatus associated therewith, receiving apparatus associated therewith in a Wheatstone bridge connection for duplex operation, a ground return located at a point beyond the influence of electrical disturbances in the region of the sending and receiving station, and balancing means at the receiving station for so adjusting the balance of the Wheatstone bridge that the point of the bridge opposite the sending connection shall be located at the receiving station instead of at the ground connection.

In testimony whereof, I have signed my name to this specification this 11th day of November, 1918.

HAROLD S. OSBORNE.